Jan. 13, 1959  G. BRUN DE SAINT HIPPOLYTE ET AL  2,868,334
BRAKING DEVICE FOR VEHICLES MOVING AT
HIGH SPEED OVER NATURAL GROUND

Filed July 13, 1954                                2 Sheets-Sheet 1

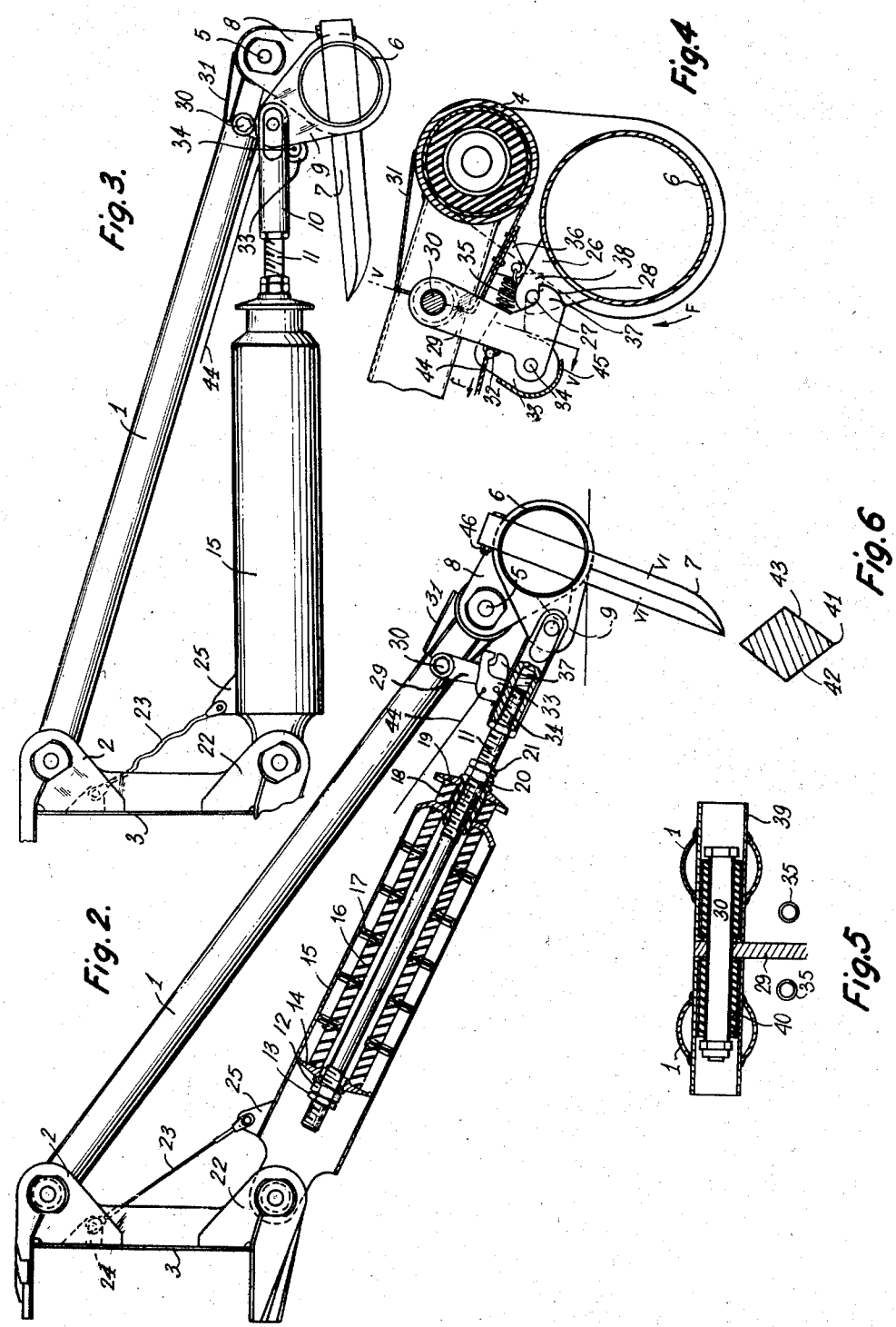

United States Patent Office 2,868,334
Patented Jan. 13, 1959

2,868,334
BRAKING DEVICE FOR VEHICLES MOVING AT HIGH SPEED OVER NATURAL GROUND

Georges Brun de Saint Hippolyte, Paris, and Roger Georges Scoazec, Colombes, France, assignors to Sud-Est Aviation Societe Nationale de Constructions Aeronautiques, Paris, France Application July 13, 1954, Serial No. 443,098
Claims priority, application France September 26, 1953
6 Claims. (Cl. 188—6)

In the U. S. Patent application Serial No. 384,642, filed by Mrs. Hereil and Jakimiuk for "Devices for Retarding and Stopping Apparatus Rolling or Slipping Directly Over the Ground," and assigned to Société Nationale de Constructions Aéronautiques du Sud-Est, there was described a braking and stopping device comprising one or a plurality of retractable teeth mounted at the rear end of the vehicle and formed with a sharp edge on their front face, so that the user may cause these teeth to project from beneath the apparatus when the latter is to be braked, the weight of the vehicle causing these teeth to penetrate the ground and to brake the vehicle through their frictional engagement with the soil material.

A device of the type broadly set forth hereinabove is adequate for homogeneous grounds, but if rigid elements such as stones, masonry elements, flush rails or any other resisting works exist purposely or accidentally at ground level, the teeth devicing their frictional engagement with the soil material will strike hard these rigid obstacles, the resulting shock being detrimental to the various component elements of the braking device and being able to involve a more or less considerable destruction of the vehicle equipped therewith.

With a view to brake vehicles moving at high speed over natural ground even if said ground is not homogeneous, the present invention provides an improved braking device of the type comprising one or a plurality of teeth mounted on a support pivotally mounted on the vehicle and adapted to be normally disengaged from the ground and projected towards the ground for penetrating and frictionally engaging the ground when the vehicle is to be braked, characterised by the fact that said support is associated with a device which allows, on the one hand, to draw the teeth from the ground when engaging a rigid obstacle and, on the other hand, to cause each drawn tooth to penetrate again the ground as soon as said teeth have outrun said rigid obstacle.

According to a first form of embodiment, the teeth are mounted on the support around a horizontal axis perpendicular to the moving direction of the vehicle, said support comprising a resilient device which, on the one hand, allows the pivotal movement of said teeth rearwardly for drawing the same from the ground, when after penetrating the ground said teeth engage a rigid obstacle, and, on the other hand, the return of said teeth in their position for penetrating the ground under the reaction of said resilient device as soon as said teeth have outrun said rigid obstacle. According to an advantageous form of embodiment, the hinged support consists of a teeth-supporting tubular cross member suspended through a pair of parallel shafts having their axes at right angles to the direction of motion of the vehicle, one shaft being pivoted on the vertex of a triangular beam pivoted through its base on the upper portion of a cross member of the vehicle to be braked, the other shaft being pivoted at either end of the tubular cross member on the relevant ends of a pair of substantially parallel resilient struts which are pivotally mounted in turn on the lower portion of the cross member of the vehicle to be braked, substantially straight below the pivot connections of the aforesaid triangular beam. Thus, the teeth may disengage themselves by performing a composite movement consisting of a rearward rotation and an upward swinging movement. Preferably, the locking device retaining the retractable support in retracted position is so arranged that in its locking condition the hoe consisting of the tubular cross member with the teeth secured thereon will position the latter in a substantially horizontal, ground-clearing position.

According to another form of embodiment, one or a plurality of annular members carrying angularly spaced teeth are mounted on at least one common tubular cross member, each annular member being normally locked on this cross member but adapted to rotate thereon for retracting the teeth against the retaining action of a locking device adapted to be released about the cross member in the direction of the stress developed therein when one tooth already engaged in the soil encounters an obstacle providing a resistance equal to or greater than a predetermined value, in which case this tooth will rotate to clear the obstacle having generated this abnormal stress, the next tooth of the same annular member penetrating the ground after the obstacle has been cleared.

Other characteristic features and advantages of this invention will become apparent as the following description proceeds with reference to the accompanying drawings, forming part of this specification and illustrating two practical embodiments of the invention. In the drawings:

Fig. 2 is a lateral view of the braking device shown in Fig. 1 with a fragmentary section of the resilient strut, the device being also shown in its braking or operative condition;

Fig. 3 is a side view similar to Fig. 2 but showing the braking device in its retracted or inoperative condition;

Fig. 4 is a part-sectional view at a greater scale, taken across the central portion of the braking hoe, showing details of the locking device;

Figure 7:
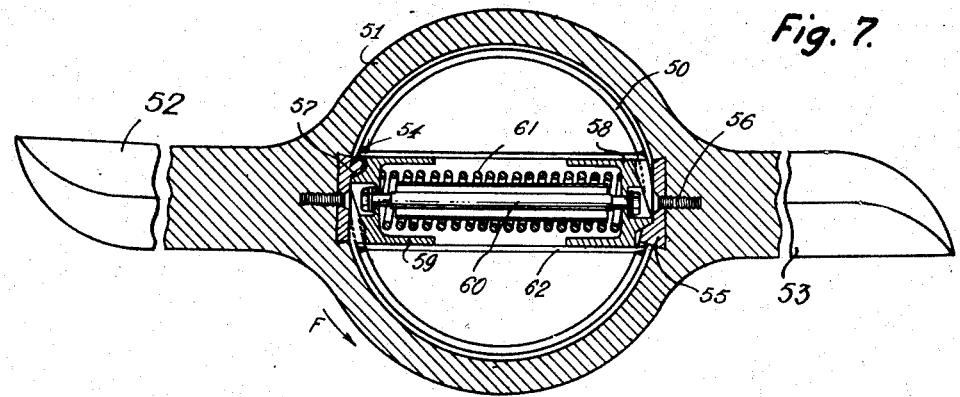
Figure 8:
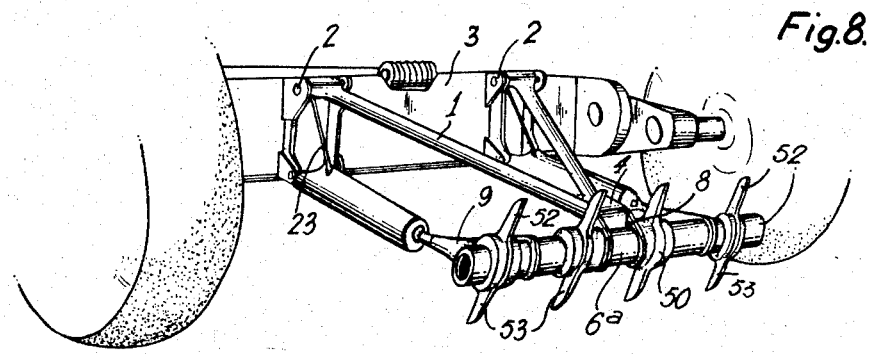

Fig. 5 is a section taken on the line V—V of Fig. 4;
Fig. 6 is a section taken on the line VI—VI of Fig. 2;
Fig. 7 is a fragmentary section of another form of embodiment of a braking device according to this invention; and Fig. 8 is an isometric view similar to that shown in Fig. 1 wherein the braking device is of the type illustrated in Fig. 7.

In the embodiment illustrated in Figs. 1 to 6 of the drawings, the braking device is shown as equipping an aircraft take-off carriage of the type disclosed in the U. S. patent application Serial No. 349,016, filed April 15, 1953, by Messrs. Jakimiuk and Hereil (now Patent 2,774,557, granted December 18, 1956) entitled "Improvements in Aircraft Take-Off Carriages and to the Method of Utilizing Same" and assigned to Société Nationale de Constructions Aéronautiques du Sud-Est, but it will be understood that this braking device is applicable as well to any other vehicle moving at high speed on the natural ground, such as an aircraft having a relatively low hull, with or without reinforcing keel, or an aircraft equipped with landing skis.

Figure 1:
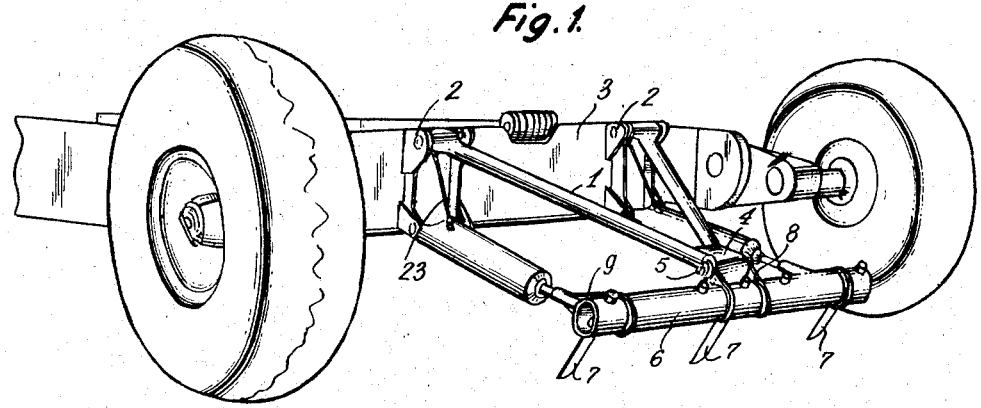
Fig. 1 is an isometric view showing the rear portion of an aircraft take-off carriage equipped with a braking device according to the invention, shown in its extended or operative condition.

This device comprises a triangular beam structure having a pair of convergent side beams 1 pivotally connected at their front ends on a pair of upper brackets 2 secured for example by welding on a cross member 3 of the vehicle to be braked which, in the case illustrated in Fig. 1, is an aircraft take-off carriage. These beams 1 are interconnected at their convergent ends by a socket 4 having its axis parallel to the pivot axes of brackets 2. This socket has mounted centrally thereof a shaft 5 supporting a tubular horizontal cross member 6 to which the teeth 7 are secured. This shaft 5 extends across a pair of lugs 8 rigid with the horizontal tubular cross member 6. A resilient shock-absorbing device of the type known under the Registered Trade Mark "Silentbloc" is mounted in the bearing 4 and surrounds the shaft 5. A locking device to be described in a later part of this specification is secured in the vicinity of the aforesaid lugs 8.

At either end the cross member 6 carries an arm 9 set at an angle with respect to the lugs 8; on these arms 9 are pivotally connected a pair of resilient struts, each consisting of an end member 10 having adjustably mounted therein a screw rod 11 the free end of which is adjustably secured through a nut 12 and a lock-nut 13 on a piston 14 slidably mounted in a cylinder 15, a series of resilient pads 16 being interposed between the piston 14 and the end wall of the cylinder 15, through which the piston rod 11 extends, as shown. The resilient pads 16 are separated by alternate annular metal members 17. By properly adjusting the screw rods in the end members 10 the resilient pads 16 can be pre-stressed to the desired extent. The pads 16 may be of natural or synthetic rubber, with or without reinforcement. A resilient pad 18 encloses the screw rod 11 externally of the cylinder 15 and is held against an abutment plate 19 by a nut 20 and a lock nut 21. Each cylinder 15 has its front end pivotally connected to a lower bracket 22 positioned below the relevant bracket 2 on the cross member 3.

The angular setting of lugs 8 with respect to the arms 9 on the tubular cross member 6 is so calculated that when this cross member 6 is in its lowermost position (Figs. 1 and 2) the point of convergence of the plane of the triangular beam 1 and of the resilient struts will be located beyond the horizontal cross member 6. This lowermost position is limited by a pair of tie-rods or cables 23 anchored at one end to lugs 24 carried by the cross member 3 and at the other end to other lugs 25 provided on the cylindrical bodies 15. In this position the teeth 7 can penetrate the ground, as shown in Fig. 2.

When the hinged assembly is raised by hand or by means of a ram (not shown) the horizontal cross member 6 rotates about the pivot pins of lugs 8 and 9 and at the same time the triangular beam 1 and the resilient struts rotate about the pivot pins of lugs 2 and 22, respectively. Thus, the teeth assume a horizontal position with their points forwards.

In this position the assembly is locked against motion by a device shown in Fig. 4. On the horizontal tubular cross member 6 are secured a pair of lugs 26 carrying a pin 27 adapted, when the assembly is raised through the pivotal movement of this cross member 6 in the direction of the arrow F, to engage a cam face 28 formed on a keeper lever 29 pivoted on a pin 30 carried by a bracket 31 secured on the bearing 4 so as to urge this lever 29 in the direction of the arrow F. At the same time the lever 29 actuates a pin 32 carried by a lock member 33 pivoted through a pin 34 on the keeper lever 29, the pin 32 also acting as an anchoring means for the front ends of a pair of springs 35 having their rear ends attached to a lug 36 secured on the bracket 31. These springs 35 are tensioned and when the pin 27 is moved toward the hook-shaped portion 37 of lever 29 while pushing the lock member 33 forward, these springs 35 cause the lever 29 to clear the pin 27 to hold same, and at the same time the hook portion 38 of lock member 33 will lock this pin 27. Under these conditions, the assembly will be positioned as shown in Fig. 4. The pin 30 on which the keeper lever 29 is pivoted is retained by a pair of sleeves 39 carried by the side convergent beams 1 through the medium of a pair of resilient devices 40 (see Fig. 5). In the locked position the lower portion of the cross member 6 may act as a trail or skid member of an ordinary tail-skid, notably when the braking and stopping device is mounted on an aircraft.

For braking the vehicle, the lever 29 is released by pulling a cable 44 attached to the pin 32. The lock member 33 will rotate about the pin 34 to release its hook portion 38 from the pin 27 until the stop portion 45 of the lock member 33 engages the retaining lever 29, so that by subsequently pulling the cable 44 the parts 29 and 33 will be caused to rotate about the pin 30 whereby the hook portion 28 will release the pin 27; consequently, the hoe consisting of the cross member 6 and teeth 7 will fall by its own weight and rotate in the opposite direction of the arrow F shown in Fig. 4, this rotational movement being occasionated by the combined action of the convergent beams and resilient struts which pivot about the pins of lugs 2 and 22, respectively, carried by the cross member 3. Thus, the teeth 7 penetrate the ground and, due to their cross-sectional profile, shown in Fig. 6 as being of diamond shape, the front edges 41 of these teeth will facilitate this penetration while the side faces 42 and 43 produce the braking action resulting from their frictional engagement with the surrounding soil material.

When the teeth 7 encounter a resistance exceeding a predetermined strength due to the presence of hard bodies in the soil, they are swung in the counter-clockwise direction or rearwardly (Figs. 2 and 3) thereby elongating the resilient struts by compressing the pads 16 therein, and, according to the speed of the vehicle to be braked, the force of inertia of the beams 1 will combine the rearward swinging movement of the teeth with an upward movement of the cross-member 6. Thus, the teeth 7 are disengaged from the ground and clear the obstacle, to fall again on the ground at a further place, due to the return action exerted by the pre-stressed resilient pads of the struts, so that the teeth will again penetrate the ground.

The teeth 7 are fitted across the cross member 6 and held in position therein by means of bolts 46. The cross member 6 may be provided with sockets as the hoe described in the aforesaid U. S. Patent application Ser. No. 384,642, in which case the teeth will be mounted on the sockets through the intermediary of quick-fastening devices of the kind described in this former patent application.

The modified embodiment illustrated in Fig. 7, although based on the same principle of retractable soil-digging teeth, differs essentially from the embodiment of Figs. 1–6 in that the teeth are secured on, or formed integrally with, a plurality of ring members, each ring member carrying two or more teeth disposed radially at spaced angular positions; these ring members are adapted to be mounted for rotation on a common tubular cross member 50. In the example shown, the ring member 51 carries two diametrally opposite teeth 52, 53. The inner periphery of the ring member is provided with a pair of stop members 54, 55 also diametrally opposite and secured through screws 56 in corresponding notches, as shown. These stops are formed with cam faces 57 engaged by a pair of correspondingly shaped cam members 58, 59 slidably mounted in a tubular guide member 62 welded across the tubular cross member 50. These cam members are urged away from each other by a common helical spring 61, a central bolt 60 being provided for facilitating the mounting of the cam members and pre-stressing the spring 61.

The cam faces of the cam members 58 and 59 acting as pawls, and the strength of their common springs 61 are so calculated that the stops 54, 55 are released by the inward pawl movements when the forces acting on the ground-engaging tooth 52, for example, exceed a predetermined value, for instance when it encounters a rigid or hard obstacle. Thus, this arrangement will protect automatically the hoe and its fixation system from damages likely to be occasionated by the aforesaid obstacles. Thus, the tooth 52 is rotated in the direction of the arrow F., together with the ring member 51 and the other tooth 53, whereby the obstacle will be cleared and thereafter the stop 55 will engage the cam member 59 and cause the other tooth 53 to penetrate the ground.

Of course, instead of forming the teeth 52 and 53 integrally with the ring member 51, the latter may be provided with sockets for detachably mounting the teeth thereon, as already suggested in the aforesaid U. S. patent application Serial No. 384,642.

Of course, many modifications may be brought to the devices shown and described herein without departing from the scope of the invention as specified in the appended claims. Thus, the rotary ring member of Fig. 7, which carries the ground-engaging teeth, may be mounted on the horizontal cross member 6 of the hinged support shown in Figs. 1–6 of the drawings, as illustrated in Fig. 8.

What we claim is:

1. In a braking device for stopping vehicles moving at high speed over natural ground and of a kind comprising at least one tooth mounted on a support pivotally mounted on the vehicle and adapted to be spaced from the ground with the vehicle running freely and to be projected towards the ground in order that each tooth penetrates and frictionally engages the ground with the vehicle braked; the improvement which comprises a frame structure having two beams hingedly mounted at one of their ends around horizontal axes on the upper portion of the rear of the vehicle to be braked and converging at their other ends, a socket having its axis perpendicular to the direction of motion of the vehicle and interconnecting the other ends of said beams, a shaft mounted through said socket, a horizontal tubular cross-member perpendicular to said direction of motion, a pair of parallel arms secured on the central portion of said tubular cross-member and pivotally mounted on said shaft on either side of said socket, a pair of substantially parallel resilient struts hingedly mounted at one of their ends around horizontal axes on the lower portion of the rear of the vehicle at points in vertical alignment with the hinged mounting of said beams, and a pair of parallel lugs secured on the end portions of said tubular cross-member, set at an angle with respect to said arms and on which are pivoted the other ends of said resilient struts around a common axis perpendicular to said direction of motion; a locking device for locking said tubular cross-member on said hingedly mounted beams so that the resilient struts attain a substantially horizontal position, and means for unlocking said locking device for the vehicle to be braked; and braking teeth mounted on said tubular cross-member, substantially parallel to said resilient struts with said tubular cross-member locked and then having their point directed toward the vehicle, whereby said teeth are inactive in the locked position of said tubular cross-member.

2. A braking device, according to claim 1, wherein each resilient strut comprises a cylindrical body pivotally mounted on the lower portion of the rear cross member of the vehicle, a stacking of alternate metal guide washers and hollow cylindrical resilient blocks slidably mounted within said cylindrical body, a central rod extending through said stacking and pivotally mounted on one lug of the pair of lugs secured on the tubular cross-member, and an abutment fixed on said central rod for compressing said stacking.

3. A braking and stopping assembly according to claim 2, wherein the central rod is adjustable in its portion which projects from the cylindrical body for pre-stressing the resilient blocks.

4. In a braking device for stopping vehicles moving at high speed over natural ground and of a kind comprising at least one tooth mounted on a support pivotally mounted on the vehicle and adapted to be spaced from the ground with the vehicle running freely and to be projected towards the ground in order that each tooth penetrates and frictionally engages the ground with the vehicle braked; the improvement which comprises at least one ring member carrying radially directed teeth disposed in angularly spaced relationship, the inner surface of each ring member having stops at the same angular relationship as said teeth, a horizontal tubular cross-member perpendicular to the direction of motion of the vehicle to be braked and on which each ring member is loosely mounted, locking means carried by said tubular cross-member and engaging the inner stops of each ring member for connecting the latter with said tubular cross-member in a direction opposite to that of the reaction exerted by the ground on one of the teeth of said ring member which penetrates the ground, means for temporarily unlocking the locking means of each ring member immediately with the tooth thereof in ground penetrating position encountering an abnormally resisting obstacle, the resulting pivotal movement of the ring member around the tubular cross-member in the direction of the reaction exerted by said obstacle ceasing with said resisting obstacle cleared by engagement of the corresponding locking means with the stops of said ring member to allow a new engagement of one of its teeth in the ground, a frame pivotally mounted on the vehicle to be braked and carrying said tubular cross-member, and means for locking said frame in a position whereat no tooth of any ring member mounted on said tubular cross-member penetrates the ground.

5. Braking device according to claim 4, wherein the inner stops of each ring member have cam faces and wherein each locking means and the corresponding unlocking means thereof comprise a radially movable cam member carried by the tubular cross-member, projecting from the outer surface of said tubular cross-member and having on its projecting part a cam face adapted to engage the cam faces of the inner stops of the corresponding ring member, and a resilient device carried by said tubular cross-member and bearing on said cam member to allow the retraction of said cam member with respect to said stops and its release towards the inner surface of the ring member.

6. Braking device according to claim 4, wherein the frame carrying the tubular cross-member comprises a frame structure having two beams hingedly mounted at one of their ends around horizontal axes on the upper portion of the rear of the vehicle to be braked and converging at their other ends, a socket having its axis perpendicular to the direction of motion of the vehicle and interconnecting the other ends of said beams, a shaft mounted through said socket, a pair of parallel arms secured on the central portion of the tubular cross-member and pivotally mounted on said shaft on either side of said socket, a pair of substantially parallel resilient struts hingedly mounted at one of their ends around horizontal axes on the lower portion of the rear of the vehicle at points in vertical alignment with the hinged mounting of said beams, a pair of parallel lugs secured on the end portions of said tubular cross-member, set at an angle with respect to said arms and on which are pivoted the other ends of said resilient struts around a comon axis perpendicular to said direction of motion, a locking device for locking said tubular cross-member on said hingedly mounted beams so that the resilient struts attain a substantially horizontal position, and means for unlocking said locking device for the vehicle to be braked.

References Cited in the file of this patent
UNITED STATES PATENTS

| | | |
|---|---|---|
| 923,332 | Clergy et al. | June 1, 1909 |
| 1,360,454 | Shaw | Nov. 30, 1920 |
| 1,613,843 | Mummert et al. | Jan. 11, 1927 |
| 1,811,199 | Irving | June 23, 1931 |
| 2,631,692 | Leslie | Mar. 17, 1953 |
| 2,648,402 | Leslie | Aug. 11, 1953 |